(12) United States Patent
Heikkinen et al.

(10) Patent No.: US 11,818,286 B2
(45) Date of Patent: Nov. 14, 2023

(54) AVATAR RECOMMENDATION AND REPLY

(71) Applicant: Snap Inc., Santa Monica, CA (US)

(72) Inventors: Christie Marie Heikkinen, Santa Monica, CA (US); David Phillip Taitz, Los Angeles, CA (US); Jeremy Baker Voss, Los Angeles, CA (US); David Whyte, Toronto (CA); Yiwen Zhan, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/834,575

(22) Filed: Mar. 30, 2020

(65) Prior Publication Data

US 2021/0306451 A1 Sep. 30, 2021

(51) Int. Cl.
*G06F 3/048* (2013.01)
*H04M 1/7243* (2021.01)
*G06F 3/0488* (2022.01)

(52) U.S. Cl.
CPC ........ *H04M 1/7243* (2021.01); *G06F 3/0488* (2013.01); *H04M 2201/42* (2013.01)

(58) Field of Classification Search
None
See application file for complete search history.

(56) References Cited

U.S. PATENT DOCUMENTS

| 5,880,731 A | 3/1999 | Liles et al. |
| 6,023,270 A | 2/2000 | Brush, II et al. |
| 6,223,165 B1 | 4/2001 | Lauffer |

(Continued)

FOREIGN PATENT DOCUMENTS

| CN | 109863532 A | 6/2019 |
| CN | 110168478 A | 8/2019 |

(Continued)

OTHER PUBLICATIONS

"Surprise!", [Online]. Retrieved from the Internet: <https://www.snap.com/en-US/news/post/surprise>, (Oct. 3, 2013), 1 pg.

(Continued)

*Primary Examiner* — Hua Lu
(74) *Attorney, Agent, or Firm* — Schwegman Lundberg & Woessner, P.A.

(57) ABSTRACT

A method starts with a processor receiving a content collection from a second computing device associated with a second user. A processor detects input of text data from a text interface overlaid on top of a display of the content collection and analyzes the text data to identify a first characteristic within the text data. The processor also accessing a plurality of personalized avatars associated with a respective avatar characteristic and determines a selection of personalized avatars that match the first characteristic by comparing the first characteristic against the respective avatar characteristic associated with each of the plurality of personalize avatars. The processor then generates a personalized avatar interface which includes the selection of personalized avatars containing an avatar characteristic that matches the first characteristic, overlays the selection of personalized avatars on the display of the content collection, and communicates a selected personalized avatar to the second computing device.

20 Claims, 13 Drawing Sheets

(56) References Cited

U.S. PATENT DOCUMENTS

| | | |
|---|---|---|
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,386,799 B1 * | 6/2008 | Clanton ............ A63F 13/12 715/861 |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,908,554 B1 * | 3/2011 | Blattner ............ G06T 13/40 715/706 |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,652,809 B1 * | 5/2017 | Levinson ............ G06Q 50/01 |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,049,477 B1 * | 8/2018 | Kokemohr ............ G06T 11/60 |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 * | 3/2019 | Charlton ............ G06V 20/20 |
| 10,242,503 B2 | 3/2019 | McPhee et al. |
| 10,262,250 B1 | 4/2019 | Spiegel et al. |
| 10,325,416 B1 * | 6/2019 | Scapel ............ A63F 13/213 |
| 10,362,219 B2 | 7/2019 | Wilson et al. |
| 10,475,225 B2 | 11/2019 | Park et al. |
| 10,504,266 B2 | 12/2019 | Blattner et al. |
| 10,547,574 B2 * | 1/2020 | Pham ............ G06F 40/56 |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0020661 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0030496 A1 * | 2/2008 | Lee ............ G06Q 10/10 345/418 |
| 2008/0059570 A1 * | 3/2008 | Bill ............ G06F 40/58 709/203 |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0115776 A1 * | 5/2009 | Bimbra ............ G06T 19/00 345/530 |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reviile et al. |
| 2010/0115426 A1 | 5/2010 | Liu et al. |
| 2010/0146407 A1 * | 6/2010 | Bokor ............ G06F 3/0481 715/757 |
| 2010/0162149 A1 | 6/2010 | Sheleheda et al. |
| 2010/0203968 A1 | 8/2010 | Gill et al. |
| 2010/0227682 A1 | 9/2010 | Reviile et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0296324 A1 * | 12/2011 | Goossens ............ G06F 3/04845 715/763 |
| 2012/0011449 A1 | 1/2012 | Sasson et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0282808 A1 * | 10/2013 | Sadanandan ............ G06Q 10/10 709/204 |

(56) References Cited

U.S. PATENT DOCUMENTS

| | | |
|---|---|---|
| 2014/0043329 A1 | 2/2014 | Wang et al. |
| 2014/0055554 A1 | 2/2014 | Du et al. |
| 2014/0082514 A1* | 3/2014 | Sivaraman ............ G06F 3/0416 715/745 |
| 2014/0125678 A1 | 5/2014 | Wang et al. |
| 2014/0129343 A1 | 5/2014 | Finster et al. |
| 2014/0157153 A1* | 6/2014 | Yuen .................... A63F 13/537 715/758 |
| 2014/0379328 A1* | 12/2014 | Kim ...................... G06F 40/274 704/9 |
| 2015/0067106 A1* | 3/2015 | Jaynes ................ H04L 65/4038 709/219 |
| 2015/0100537 A1* | 4/2015 | Grieves .................... G06N 5/02 706/52 |
| 2015/0206349 A1 | 7/2015 | Rosenthal et al. |
| 2016/0085773 A1* | 3/2016 | Chang .................... G06F 16/29 715/753 |
| 2016/0134840 A1 | 5/2016 | Mcculloch |
| 2016/0234149 A1 | 8/2016 | Tsuda et al. |
| 2016/0253552 A1* | 9/2016 | Rihn ...................... H04W 4/029 382/224 |
| 2016/0359777 A1* | 12/2016 | Tucker ................ H04L 12/1827 |
| 2016/0361653 A1* | 12/2016 | Zhang .................... A63F 13/655 |
| 2017/0031550 A1 | 2/2017 | Shaffer |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0286752 A1* | 10/2017 | Gusarov .............. G06V 40/171 |
| 2017/0310934 A1 | 10/2017 | Du et al. |
| 2017/0312634 A1 | 11/2017 | Ledoux et al. |
| 2017/0344224 A1* | 11/2017 | Kay ...................... G06F 3/0482 |
| 2018/0005420 A1* | 1/2018 | Bondich .............. G06V 40/176 |
| 2018/0025219 A1* | 1/2018 | Baldwin .................. H04L 51/04 382/118 |
| 2018/0032212 A1* | 2/2018 | Choi .................... G06F 3/04842 |
| 2018/0047200 A1 | 2/2018 | O'hara et al. |
| 2018/0083898 A1 | 3/2018 | Pham |
| 2018/0091732 A1* | 3/2018 | Wilson .................... H04N 23/64 |
| 2018/0107866 A1* | 4/2018 | Li .............................. G06T 7/11 |
| 2018/0113587 A1 | 4/2018 | Allen et al. |
| 2018/0115503 A1 | 4/2018 | Baldwin et al. |
| 2018/0188916 A1* | 7/2018 | Lyons .................... G06F 3/0482 |
| 2018/0191651 A1* | 7/2018 | Goldberg ................ H04L 51/08 |
| 2018/0300542 A1* | 10/2018 | Waddell .............. G06V 30/387 |
| 2018/0315076 A1 | 11/2018 | Andreou |
| 2018/0315133 A1 | 11/2018 | Brody et al. |
| 2018/0315134 A1* | 11/2018 | Amitay ................ H04L 51/222 |
| 2018/0329622 A1* | 11/2018 | Missig ................ G06F 3/04886 |
| 2018/0329960 A1* | 11/2018 | Liu ........................ H04L 51/04 |
| 2019/0001223 A1 | 1/2019 | Blackstock et al. |
| 2019/0057616 A1 | 2/2019 | Cohen et al. |
| 2019/0098087 A1* | 3/2019 | Johnston ................ G06F 16/13 |
| 2019/0140990 A1 | 5/2019 | Rabbat et al. |
| 2019/0147112 A1* | 5/2019 | Gordon .................. G06N 20/00 706/12 |
| 2019/0188920 A1 | 6/2019 | Mcphee et al. |
| 2020/0043145 A1* | 2/2020 | Cao ........................ G06T 5/005 |
| 2020/0312008 A1* | 10/2020 | Cowburn .............. G06V 30/274 |
| 2020/0404065 A1* | 12/2020 | Schissel ................ G06F 16/248 |
| 2021/0271385 A1* | 9/2021 | Uy ...................... G06F 3/04886 |
| 2021/0304469 A1 | 9/2021 | Heikkinen et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

Buscemi, Scott, "Snapchat introduces 'Stories', a narrative built with snaps", [Online] Retrieved from the Internet: <https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo & Video Tales", [Online]. Retrieved from the Internet: <https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online]. Retrieved from the Internet: <https://www.theverge.com/2013/10/3/4791934/snapchats-next-big-thing-stories-that-dont-just-disappear>, (Oct. 3, 2013), 5 pgs.

U.S. Appl. No. 16/834,438, filed Mar. 30, 2020, Personalized Media Overlay Recommendation.

"U.S. Appl. No. 16/834,438, Non Final Office Action dated Mar. 3, 2021", 7 pgs.

"U.S. Appl. No. 15/803,681, Final Office Action dated Jul. 29, 2019", 14 pgs.

"U.S. Appl. No. 15/803,681, Final Office Action dated Nov. 4, 2020", 15 pgs.

"U.S. Appl. No. 15/803,681, Final Office Action dated Dec. 9, 2021", 16 pgs.

"U.S. Appl. No. 15/803,681, Non Final Office Action dated Apr. 4, 2019", 9 pgs.

"U.S. Appl. No. 15/803,681, Non Final Office Action dated Apr. 30, 2020", 13 pgs.

"U.S. Appl. No. 15/803,681, Non Final Office Action dated Jun. 14, 2021", 15 pgs.

"U.S. Appl. No. 15/803,681, Response filed Mar. 3, 2021 to Final Office Action dated Nov. 4, 2020", 11 pgs.

"U.S. Appl. No. 15/803,681, Response filed Jul. 3, 2019 to Non Final Office Action dated Apr. 4, 2019", 12 pgs.

"U.S. Appl. No. 15/803,681, Response filed Jul. 22, 2020 to Non Final Office Action dated Apr. 30, 2020", 10 pgs.

"U.S. Appl. No. 15/803,681, Response filed Sep. 14, 2021 to Non Final Office Action dated Jun. 14, 2021", 12 pgs.

"U.S. Appl. No. 15/803,681, Response filed Oct. 29, 2019 to Final Office Action dated Jul. 29, 2019", 14 pgs.

"U.S. Appl. No. 16/834,438, Final Office Action dated Sep. 15, 2021", 11 pgs.

"U.S. Appl. No. 16/834,438, Non Final Office Action dated Jan. 4, 2022", 13 pgs.

"U.S. Appl. No. 16/834,438, Response filed Jun. 2, 2021 to Non Final Office Action dated Mar. 3, 2021", 8 pgs.

"U.S. Appl. No. 16/834,438, Response filed Dec. 15, 2021 to Final Office Action dated Sep. 15, 2021", 8 pgs.

"U.S. Appl. No. 16/834,438, Response filed May 4, 2022 to Non Final Office Action dated Jan. 4, 2022", 9 pgs.

"U.S. Appl. No. 16/834,438, Final Office Action dated Aug. 3, 2022", 15 pgs.

"U.S. Appl. No. 16/834,438, Notice of Allowance dated Nov. 30, 2022", 8 pgs.

"U.S. Appl. No. 16/834,438, Response filed Nov. 3, 2022 to Final Office Action dated Aug. 3, 2022", 11 pgs.

\* cited by examiner

AVATAR RECOMMENDATION AND REPLY

BACKGROUND

As the popularity of mobile based social networking systems continues to grow, users increasingly share media content items, such as electronic images, animations, or videos with each other. These media content items are typically uniquely personalized, and thus, reflect a demand to encourage electronic visual communication on a global scale.

Social networking systems comprise millions of users. Each user in a social networking system can transmit media content items between members of his or her individual social networking profile or to individuals outside of the social networking profile.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
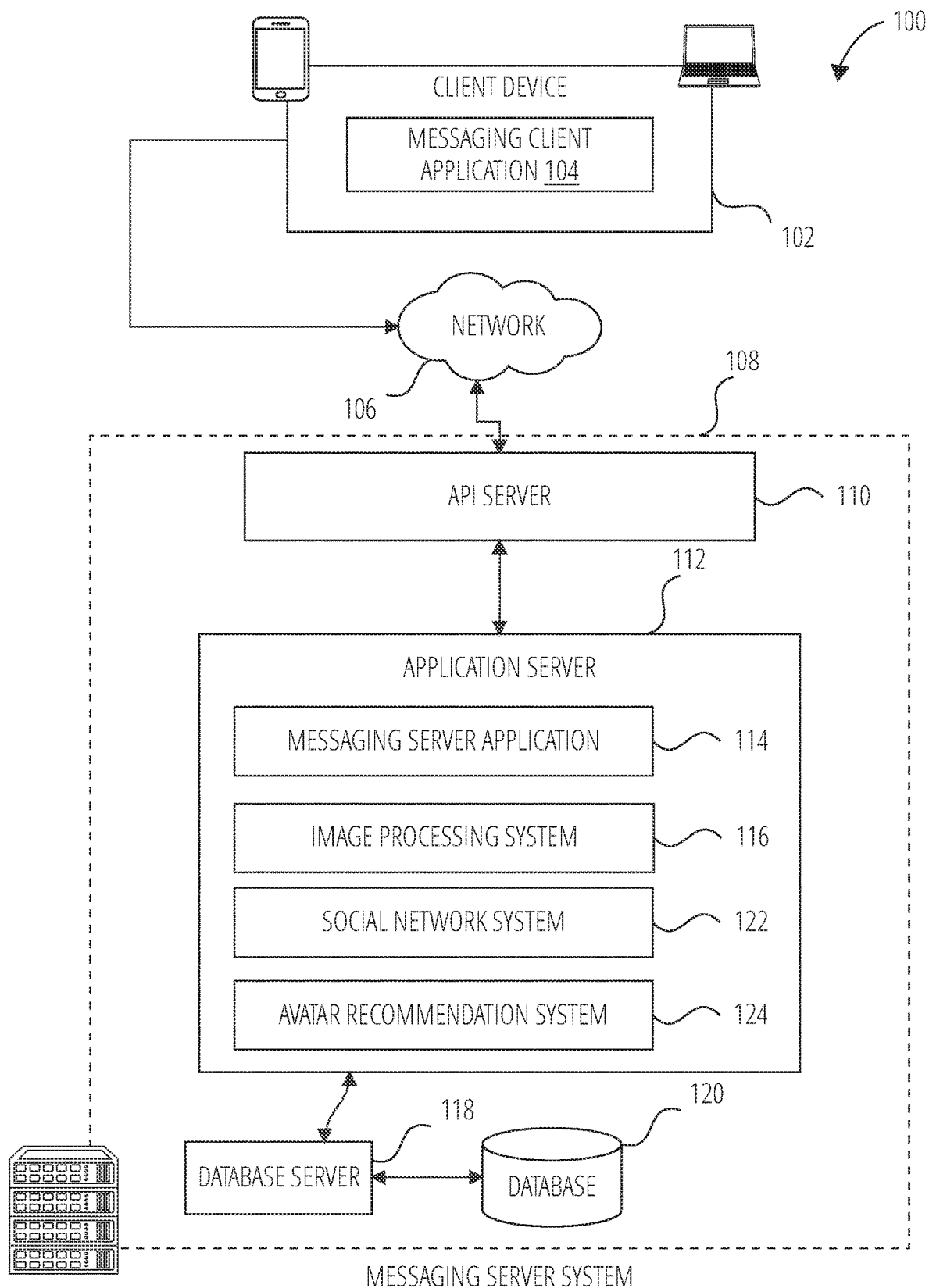
FIG. 1 is a diagrammatic representation of a networked environment in which the present disclosure may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

When sending media content items between users, it is paramount that the social networking systems provide the ability to present to each user the media content items that are most interesting or relevant to them. The ability to modify and customize media content items during the generation stage of such items, improves interconnectivity and interactivity of the end user dramatically. In at least one embodiment of the present disclosure, a system is provided that improves on the functionality of recommending and replying with personalized avatars that are also overlaid on top of media content items while accessing and viewing a content collection or ephemeral message content collection. The system accesses data entered into a text interface (e.g. A chat field) while the user is viewing a content collection and determines which words, phrases, numbers, or letters, are associated with the stored personalized avatars.

Once the system finds a match of associated personalized avatars, a second avatar interface is generated in order to display the personalized avatars that correspond to the analyzed words, phrases, numbers, or letters in text interface and permit the user to reply with the selected personalized avatar while viewing a content collection. In another example, a user of the client device is able to select the desired avatar that is associated with analyzed words, phrases, numbers, or letters in text interface and overlay on top of the content collection or ephemeral message content collection while viewing the content collection in real-time.

In another example, a predetermined set of avatars are organized and overlaid in another avatar interface on top of the media content item prior to the user inputting text within the text interface. These predetermined set of avatars contain characteristics that match the profile information indicated in a user profile of the client device. If the user chooses, he can select from one of the predetermined set of avatars that match the profile information of the user in order to permit the user to reply with the selected personalized avatar while viewing the content collection.

Embodiments of the present disclosure improve the functionality of avatar recommendation systems in electronic messaging and imaging software systems by accessing and determining, while having access and during viewing of content collections or ephemeral content collections, which terms in a text interface are directly associated with personalized avatars. The avatar recommendation system also minimizes the delay in executing an augmented overlay and reply function using avatars thereby simplifying and technologically enhancing the animation and content collection generation process.

FIG. 1 is a block diagram showing an example messaging system 100 for exchanging data (e.g., messages and associated content) over a network. The messaging system 100 includes multiple instances of a Client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a Client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, Client Device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data that is, in one example, displayed in sequence at a predetermined frame rate (e.g., content collection), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122, and an avatar recommendation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be sequentially aggregated into collections of content (e.g., called content collections or galleries). These collections are then made available, by the messaging server application 114, to the messaging client application 104. Other Processor and memory intensive processing of data may also be performed server-side by the messaging server application 114, in view of the hardware requirements for such processing.

The application server 112 also includes an image processing system 116 that is responsible for performing various image processing operations, typically with respect to images or video received within the payload of a message at the messaging server application 114.

Figure 3:
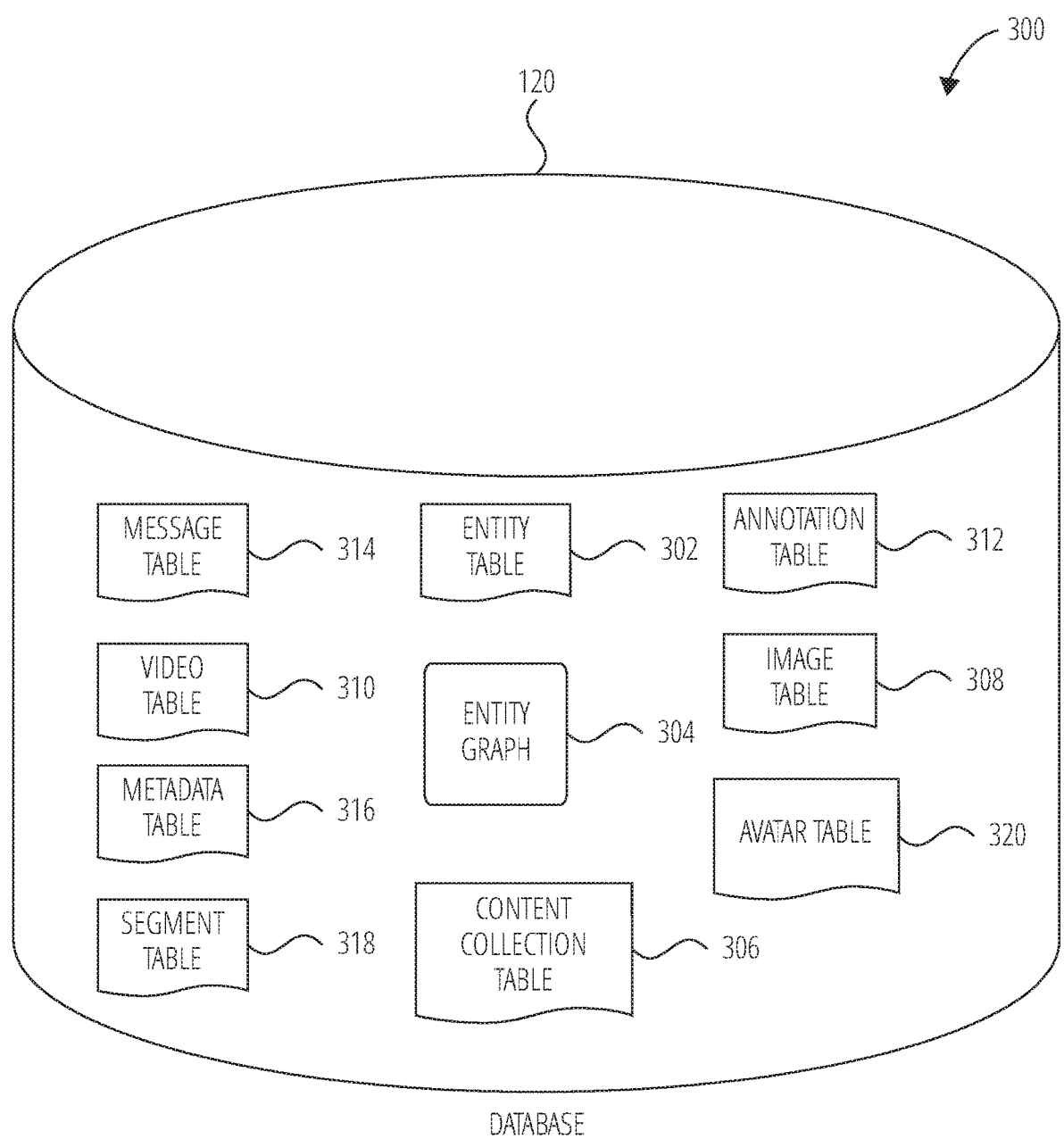
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

The avatar recommendation system 124 is responsible for managing the recommendation process of personalized avatars that are generated in an avatar interface and permit the user to reply to a content collection with the selected personalized avatar while viewing a content collection. The avatar interface may be overlaid on top of the media content items while accessing and viewing the content collection or ephemeral content collections. The avatar recommendation system 124 analyzes text information entered into a text interface and associates all or portions of the text information with content characteristics associated with personalized avatars, as shown and explained further in FIG. 5 below.

Figure 2:
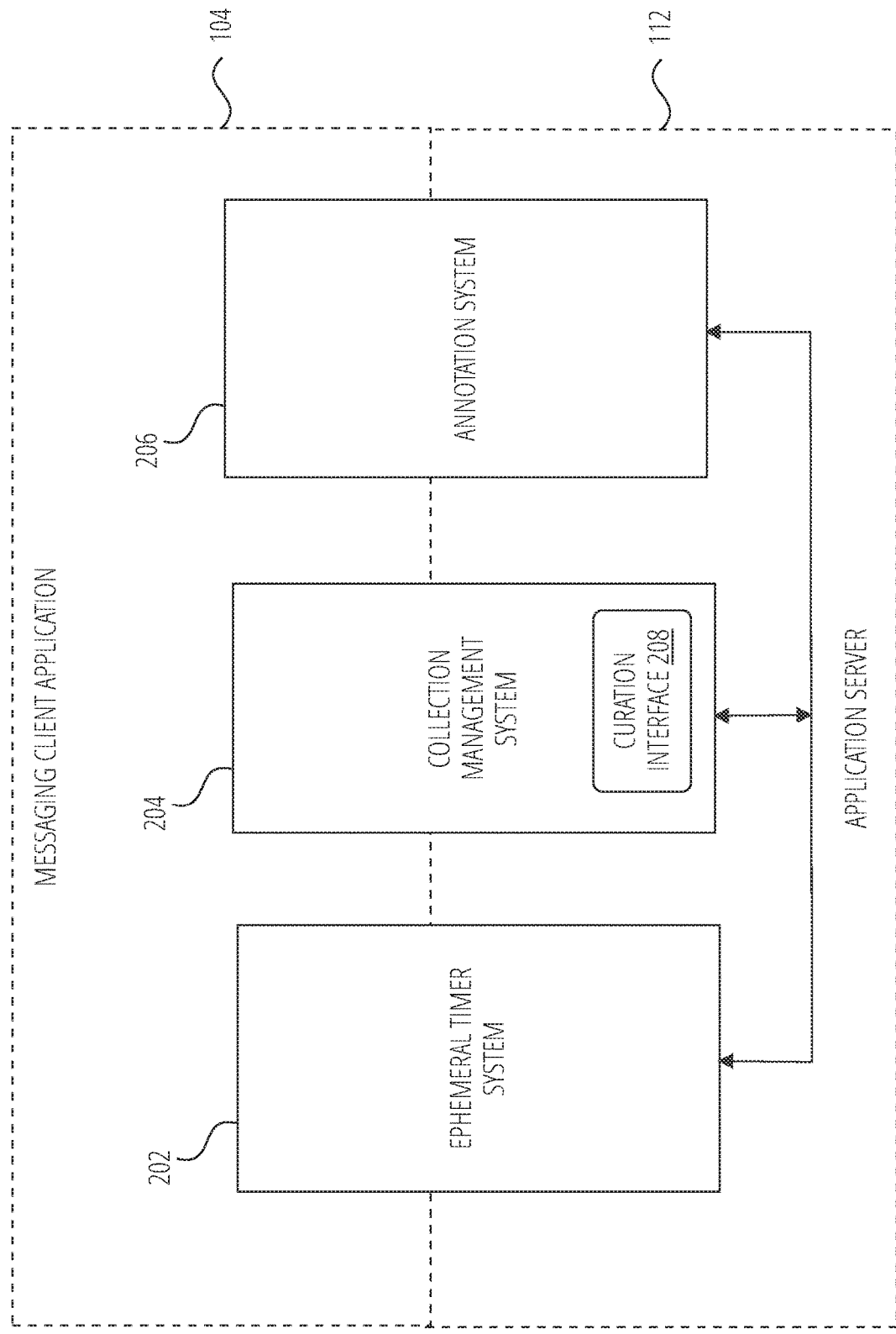
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a content collection), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event content collection." Such a collection may be made available for a specified time period, such as the duration of an event to which the content relates. For example, content relating to a music concert may be made available as a "content collection" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the Client device 102. In another example, the annotation system 206 operatively supplies a media overlay to the messaging client application 104 based on other information, such as social network information of the user of the Client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the Client device 102. For example, the media overlay may include text that can be overlaid on top of a photograph taken by the Client device 102. In another example, the media overlay includes an identification of a location overlay (e.g., Venice beach), a name of a live event, or a name of a merchant overlay (e.g., Beach Coffee House). In another example, the annotation system 206 uses the geolocation of the Client device 102 to identify a media overlay that includes the name of a merchant at the geolocation of the Client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the Client device 102. Another type of filer is a data filer, which may be selectively presented to a sending user by the messaging client application 104, based on other inputs or information gathered by the Client device 102 during the message creation process. Example of data filters include current temperature at a specific location, a current speed at which a sending user is traveling, battery life for a Client device 102, or the current time.

Other annotation data that may be stored within the image table 308 are augmented reality content items (e.g., corresponding to applying Lenses or augmented reality experiences). An augmented reality content item may be a real-time special effect and sound that may be added to an image or a video.

As described above, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A content collection table 306 stores data regarding collections of messages and associated image, video, or audio data, which are compiled into a collection (e.g., a content collection or a gallery). The creation of a particular collection may be initiated by a particular user (e.g., each user for which a record is maintained in the entity table 302). A user may create a "personal content collection" in the form of a collection of content that has been created and sent/broadcast by that user. To this end, the user interface of the messaging client application 104 may include an icon that is user-selectable to enable a sending user to add specific content to his or her personal content collection.

A collection may also constitute a "live content collection," which is a collection of content from multiple users that is created manually, automatically, or using a combination of manual and automatic techniques. For example, a "live content collection" may constitute a curated stream of user-submitted content from varies locations and events. Users whose client devices have location services enabled and are at a common location event at a particular time may, for example, be presented with an option, via a user interface of the messaging client application 104, to contribute content to a particular live content collection. The live content collection may be identified to the user by the messaging client application 104, based on his or her location. The end result is a "live content collection" told from a community perspective.

A further type of content collection is known as a "location content collection", which enables a user whose Client device 102 is located within a specific geographic location (e.g., on a college or university campus) to contribute to a particular collection. In some embodiments, a contribution to a location content collection may require a second degree of authentication to verify that the end user belongs to a specific organization or other entity (e.g., is a student on the university campus).

The database 120 also stores a metadata table 316, segment table 318, and an avatar table 320. The metadata table 316 includes the metadata associated with the media content items, personalized avatars, media overlay icons, three-dimensional (3D) animation graphics and objects, or two-dimensional (2D) images. The metadata can include any words, phrases, image size, visual characteristic that are descriptive. The metadata can be associated with the animation, including 3D animation, that is created by a content creator and the media content identifier. The personalized avatar can include a plurality of personalized avatar segments, which may also be referred to as avatar characteristics, that include components and characteristics relating to a user's avatar digital likeness, image, and personality.

The personalized avatar may also include additional digital icons and digital characteristics integrated into the design of the personalized avatar. For instance, the user's personalized avatar may be a man holding a basketball and wearing a NY Knicks basketball jersey depicting that the user enjoys playing basketball and watching NY Knicks basketball games. The segment table 318 can store the avatar segments (e.g., avatar characteristics). The avatar table 320 can store personalized avatars associated with each of the avatar characteristics stored in the segment table 318. For example, once personalized avatar with the same or similar avatar characteristic corresponding to text information input by a user of the client device 102, the avatar table 320 can provide the associated avatar for inclusion into the avatar interface and eventual transmission or communication to a second computing device while accessing and viewing the content collection.

Figure 4:
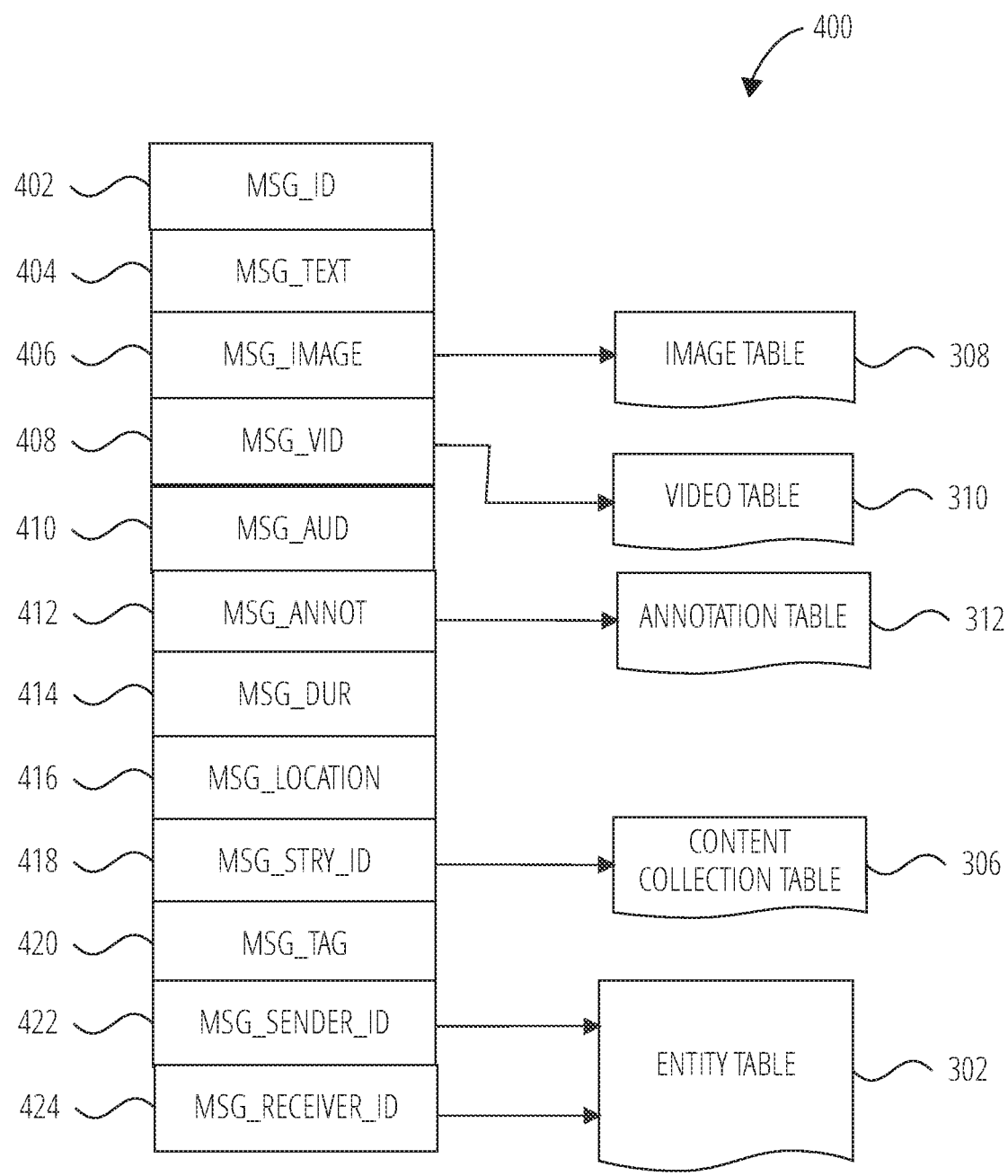
FIG. 4 is a diagrammatic representation of a message, in accordance with some example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the Client device 102 and that is included in the message 400.

A message image payload 406: image data, captured by a camera component of a Client device 102 or retrieved from a memory component of a Client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message content collection identifier 418: identifier values identifying one or more content collections (e.g., "content collections") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the Client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message content collection identifier 418 may point to data stored in a content collection table 306, and values stored within the message sender identifier 422 and the message receiver identifier 424 may point to user records stored within an entity table 302.

Figure 5:
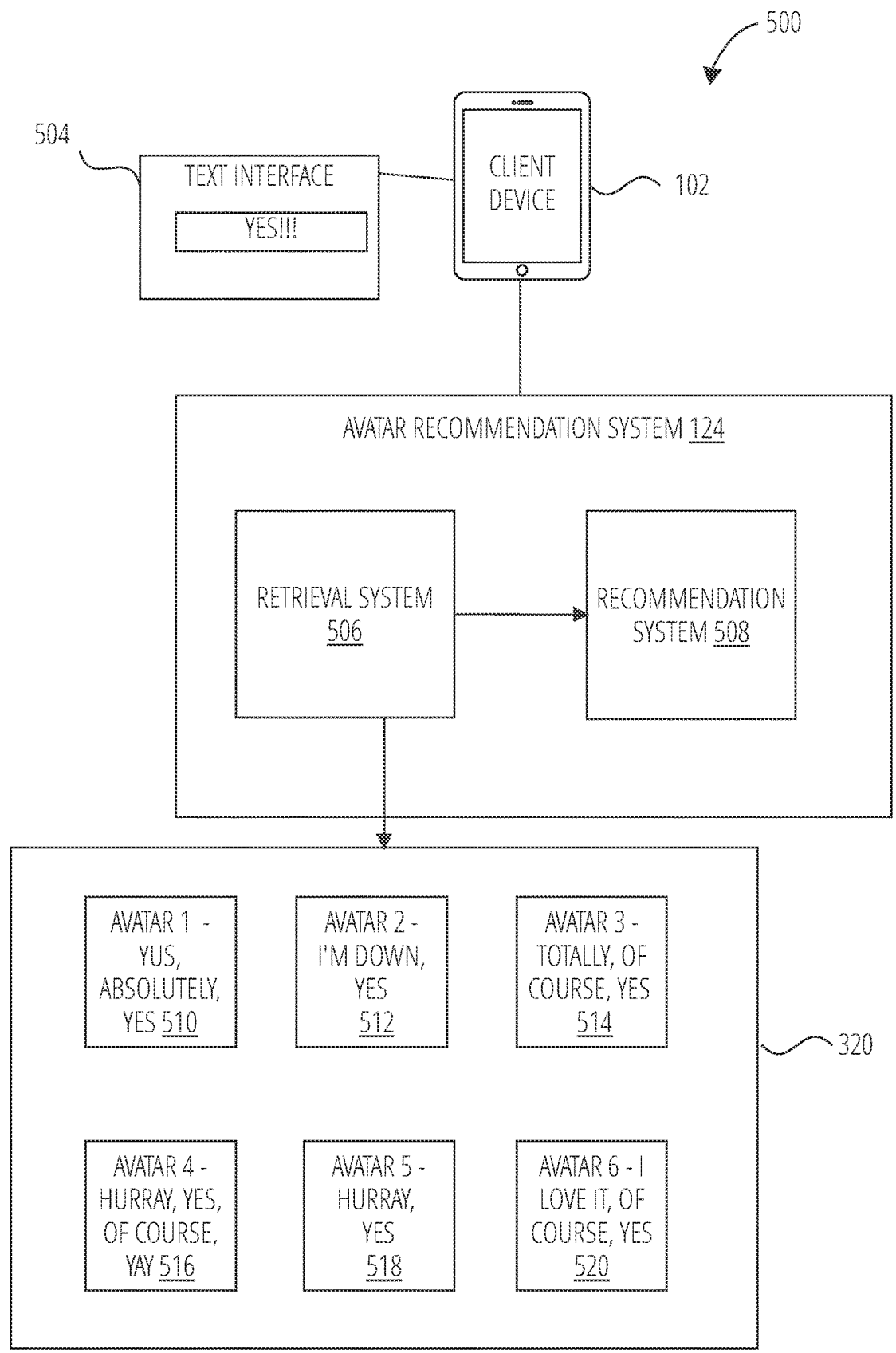
FIG. 5 illustrates a diagrammatic representation of the details of the avatar recommendation system recommendation system in accordance with one embodiment.

FIG. 5 illustrates a diagrammatic representation of the details of the avatar recommendation system 124 in accordance with one embodiment. Users of the social network system 122, which may also be referred to as content creators (e.g., animators) can upload or download new media item content periodically to the messaging server system 108 in FIG. 1. The content creators can upload or download the new media item content via an electronic computing device (e.g., client device 102) or new content can be uploaded by the messaging server system 108. The media item content can be in the form of video, images, pictures, or animation and may be used in order to during or prior to the generation of a content collection, ephemeral content collection, or ephemeral message.

In one embodiment, while a user of the client device 102 is accessing and viewing content collection, the avatar recommendation system 124 receives a string of text information from a text interface 504 displayed in the client device 102. The descriptive text data may be any combination of a single word, phrase, title, slogan, or sentence that describes any action, event, place, or object that the content creator desires to input. The text interface 504 is an interface that permits a user or content creator to input a text string which includes letters, numbers, or special characters to be superimposed or overlaid on top of an ephemeral message, content collection, or ephemeral content collection as the user is viewing the content collection. client device 102 analyzes the text information to determine which portion, whole or in part, of the text information matches, in whole or in part, with the avatar characteristics stored in the segment table 318.

As shown in FIG. 5, the retrieval system 506 of the avatar recommendation system 124 can retrieve (or fetch) the personalized avatars from the avatar table 320 that match (in whole or in part) avatar characteristics associated with the text information. For instance, the text interface 504 includes descriptive text data "Yes!!!" The avatar recommendation system 124 can identify a portion of this text information, which may be referred to as a first characteristic, and determine which metadata in the segment table 318 and metadata table 316 matches or is similar to the personalized avatars stored in the avatar table 320.

As shown, the recommendation system 508 analyzes the database 120 utilizing machine learning and heuristics algorithms and generates an avatar interface at the client device 102 including each of the avatars 1-6. The avatars 1-6 shown in FIG. 5 each contain associated avatar characteristics that match or similarly match (in whole or in part) the text information entered via the text interface 504 at the client device 102. For instance, avatar 1 contains avatar characteristics including "YUS, absolutely, yes;" avatar 2 contains the avatar characteristic including "I'm down and yes;" avatar 3 contains avatar characteristics including "totally, of course, and yes;" avatar 4 contains avatar characteristics including "hurray, yes, of course, and Yay;" avatar 5 contain avatar characteristics including "hurray and Yes;" and avatar 6 contain avatar characteristics including "I love it, or course, and yes". The retrieval system 506 may also rank each avatar in the avatar interface according to a number or frequency of confirmed matches between the text information and associated avatar characteristics.

In one example, the retrieval system 506 generates an additional avatar interface, that is activated via user gesture detected by the client device 102, that includes personalized avatars that match (in whole or in part) avatar characteristics associated with a user's affinity stored in a user's profile of the client device 102 or a second user's affinity stored at a second user profile of a second client device. For instance, a user affinity can include sentiment categories that reflect a user's personality, likeness, attributes, moods, or state of minds. The sentiment categories can contain characteristics that are mapped a predetermined set of avatars stored at the avatar table 320. The predetermined set of avatars stored at the avatar table 320 that are mapped to sentiment avatar category digitally depict the associated user affinity. The second client device can be any client device that is connected via the social network system 122 with the client device 102.

Figure 6:
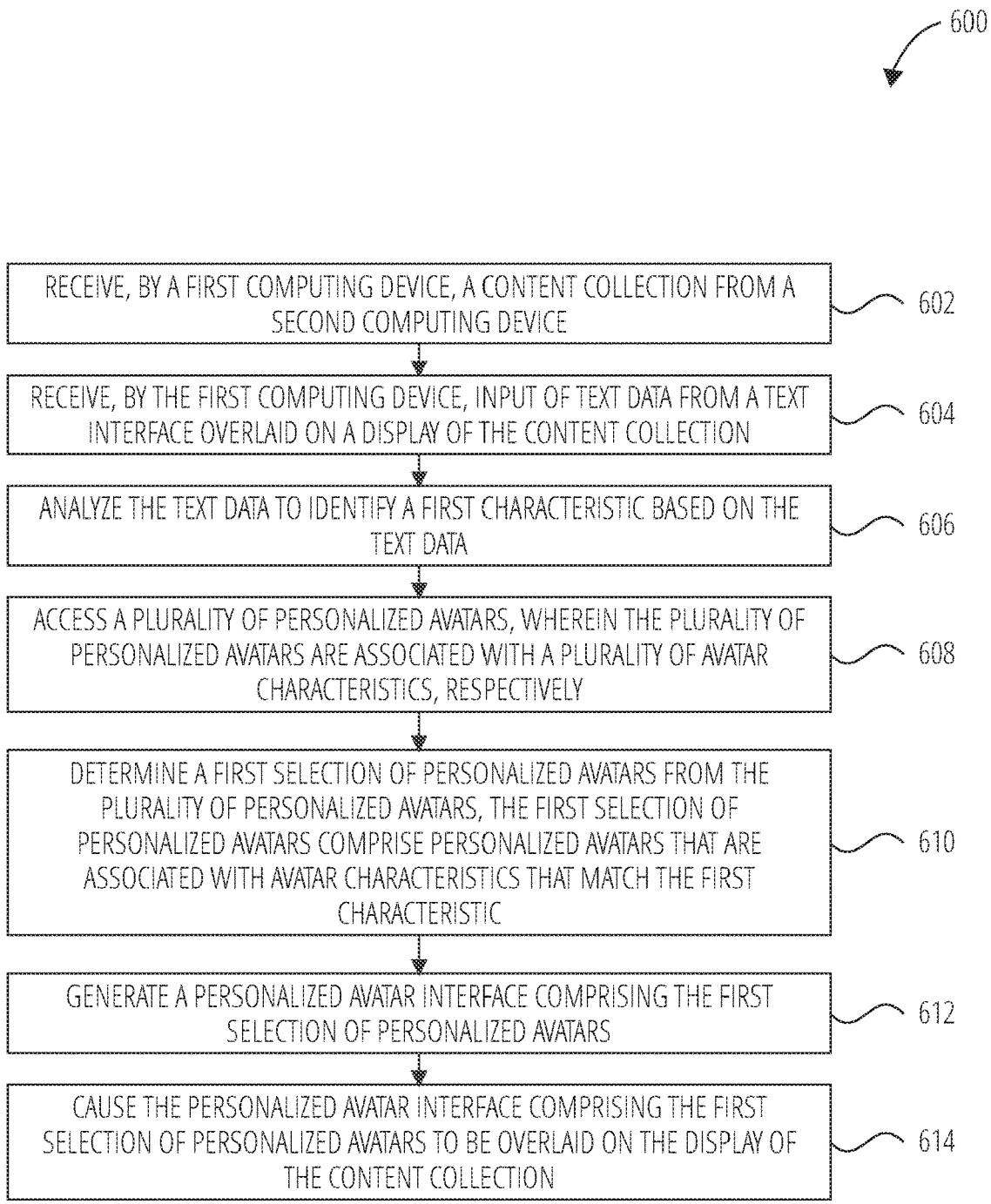
FIG. 6 illustrates a flowchart of a process for recommending avatars via a text interface, in accordance with one embodiment.

FIG. 6 illustrates a flowchart of a process for recommending avatars via a text interface, in accordance with one embodiment. In block 602, routine 600 receives, by a first computing device, a content collection from a second computing device. In operation 604, the computing system (avatar recommendation system 124) receives, by the first computing device, input of text data from a text interface overlaid on a display of the content collection. For example, a user of the client device inputs text information during and while accessing content collection via a text interface 504 displayed on the client device. In one example, the text information can be any descriptive information the user chooses to enter in reply while viewing a content collection displayed on the client device. As discussed previously, the text information includes any of a combination of a single word, phrase, title, slogan, or sentence that describes any action, event, place, or object that the user of the client device (e.g., a content creator) desires to input. The text information may also be referred to as chat information and may be input into the text interface 504 as a response while viewing content collection (including an ephemeral message 1002), ephemeral content collection, or non-ephemeral content collection.

In operation 606, the computing system analyzes the text data to identify a first characteristic based on the text data. In one example, the text information may be analyzed in order to determine which portion, whole or in part, of the text information matches, in whole or in part, with the avatar characteristics stored in the segment table 318. The first characteristic may include a single word, single phrase, or a combination of words, phrases, or letters, that are associated with avatar characteristics stored in the segment table 318. The retrieval system 506 may execute the operations of 606.

In operation 608, the computing system accesses a plurality of personalized avatars, wherein the plurality of personalized avatars are associated with a plurality of avatar characteristics, and in operation 610, determines a first selection of personalized avatars from the plurality of personalized avatars, the first selection of personalized avatars comprise personalized avatars that are associated with avatar characteristics that match the first characteristic. In one example, determining the first selection of personalized avatars includes comparing the first characteristic against each of the plurality of avatar characteristics associated with the plurality of personalize avatars. In response to determining that a selection of personalized avatars comprise an avatar characteristic that match the first characteristic by comparing the first characteristic against the respective avatar characteristic associated with each of the plurality of personalize avatars, the computing system generates, in operation 612, a personalized avatar interface comprising the first selection of personalized avatars and, in operation 614, causes the personalized avatar interface comprising the first selection of personalized avatars to be overlaid on the display of the content collection.

In one example, the computing system communicates or transmits, to a second computing device, a selected personalized avatar from the personalized avatar interface during access to the content collection. In other words, in one example, the user of the first client device can select a selected personalized avatar (see FIG. 8) via the display interface of the first client device and the selected personalized avatar is transmitted to the second client device. The user of the computing system can respond to a content collection by selecting a personalized avatar, and then transmitting the selected personalized avatar while viewing the content collection. For instance, if the user is viewing another user's content collection and intends to respond to an image displayed in the other user's content collection, instead of responding with a word or phrase, e.g. "nice", the user can respond with one of the personalized avatars that appear in the avatar interface. This occurs as the user is viewing the content collection in real-time. An extended avatar interface is generated as the user implements a user gesture, such as a hand or finger swipe on the display of the client device 102. In another example, the user can execute an additional user gesture, such as a hand, finger, body movement, eye gaze, or head movement, in order to remove the extended avatar interface, minimize, or shift to another display interface In one example, the extended avatar interface includes a larger or extended group of avatars that include avatar characteristics that match the first characteristic from the text interface 504.

Figure 7:
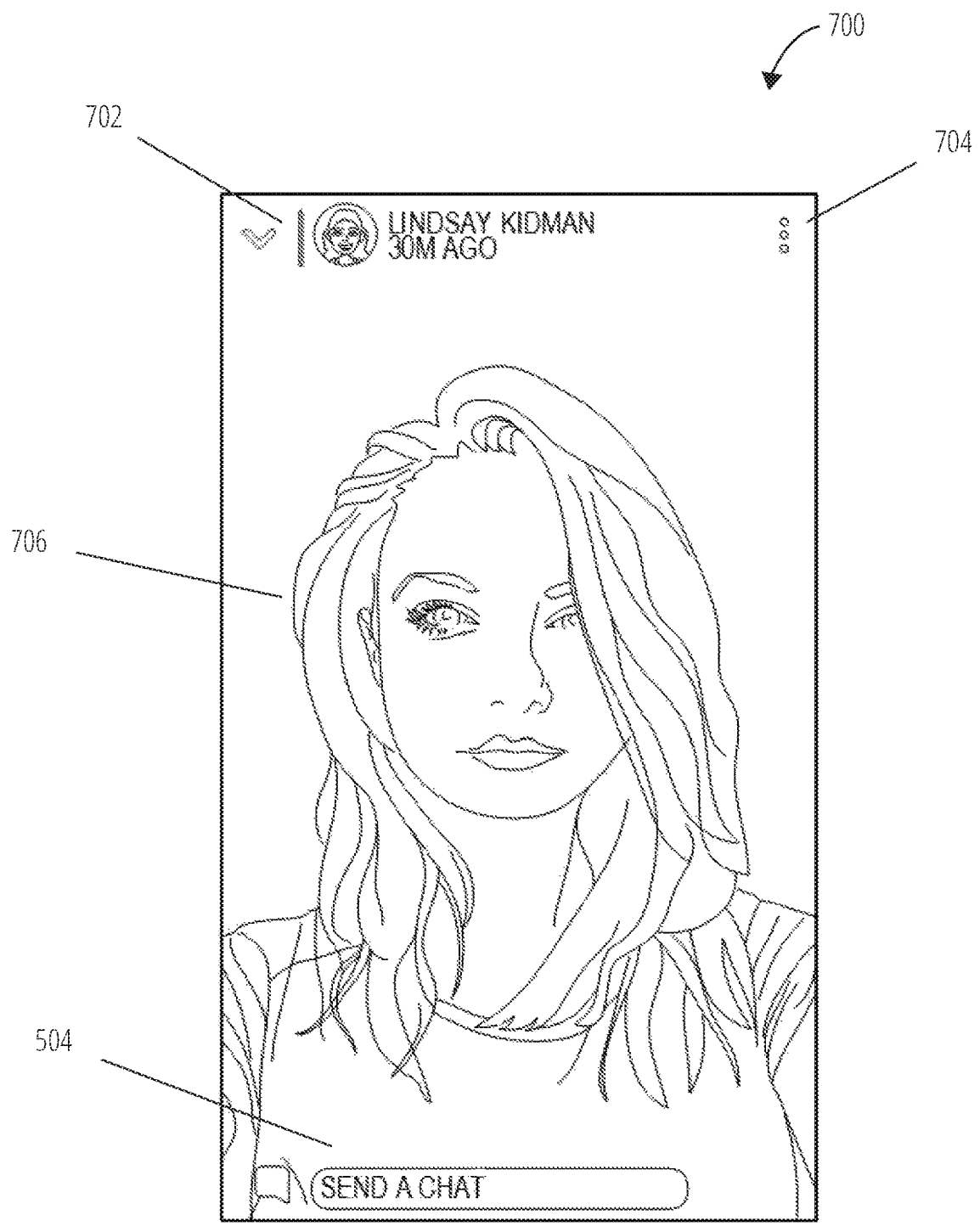
FIG. 7 illustrates an example of a user interface depicting a media content item being displayed by a client device in accordance with one embodiment.

FIG. 7 illustrates an example of a user interface depicting a media content item being displayed during a content collection by a client device in accordance with one embodiment. The user interface 700 includes a user profile button 702, menu option 704, media content item 706, text interface 504. As explain above, the media content item may be any image, video, animation, content collection, ephemeral message, or ephemeral content collection. For illustration purposes, FIG. 7 includes an image of a user of the client device 102 being displayed during an ephemeral content collection.

The menu option 704 may be activated and expose a plurality of menu options, including but not limited to, accessing a friend list, viewing content collection generation scores, viewing rewards, accessing settings, or the like. The user profile button 702 may provide access to the user profile of the client device, including but not limited to, the user name, affinity, user likeness, user mood, duration of online access to content collection, a listing of contacts within a contact database, and the like. The user profile button 702 also allows the user to add additional contacts to the contact database and manage content collections received or transmitted between the client device 102 and another computing device connected to the client device 102 via the social network system 122.

The user interface 700 also includes the text interface 504 which, in one example, is directed to a data field designed to receive user input in the form of alpha-numeric character string. There may be a predetermined limit as to how many characters are permitted within the text interface 504. The alpha-numeric character string may also be referred to as a chat field that is overlaid or superimposed on top of the media content item while accessing and viewing a content collection or ephemeral message.

Figure 8:
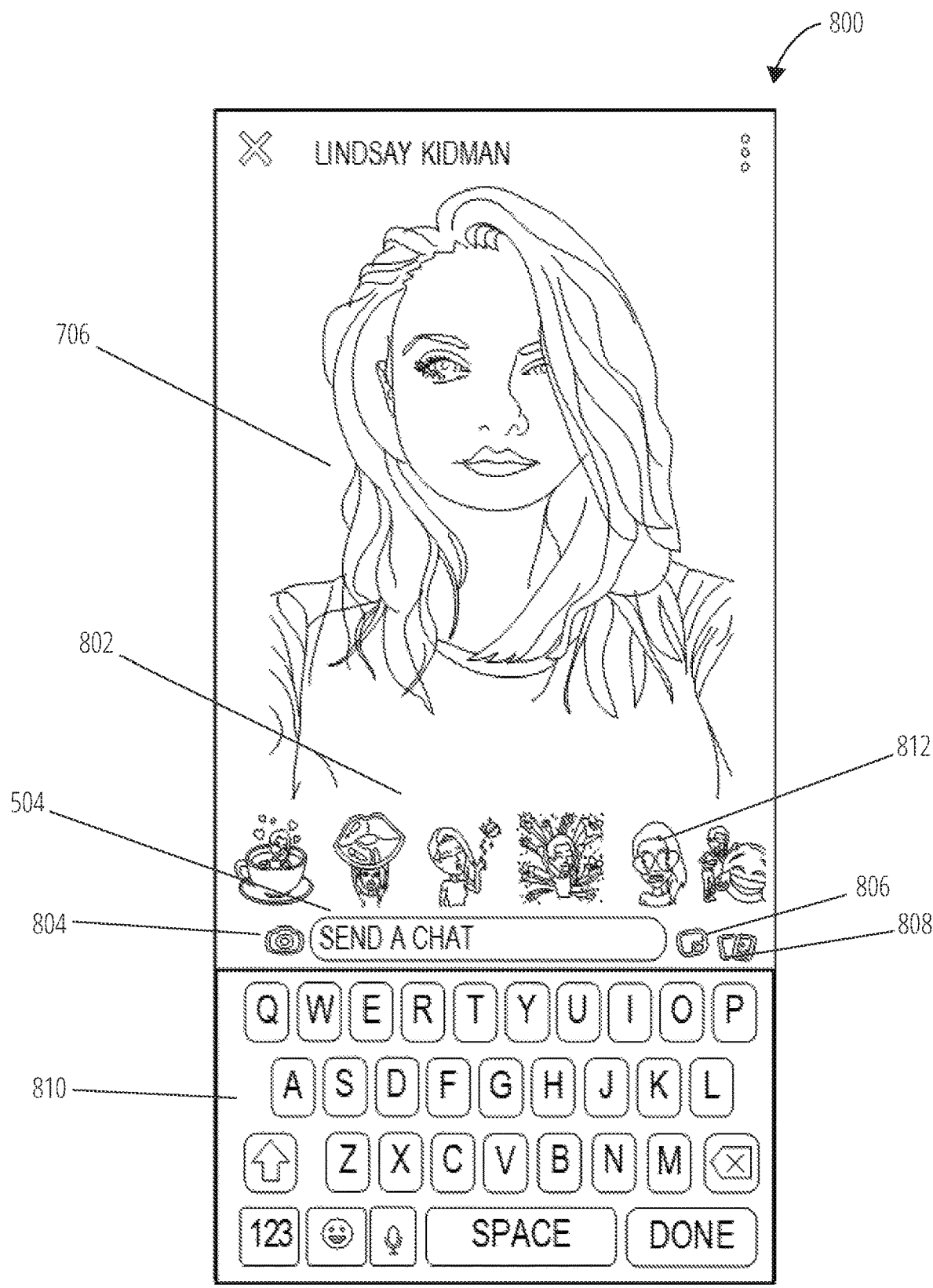
FIG. 8 illustrates an example of a user interface depicting at least a text interface and an predetermined set of personalized avatar interface being displayed by a client device in accordance with one embodiment.

FIG. 8 illustrates an example of a user interface 800 depicting at least a text interface 708 and a personalized avatar interface 802 containing a selectable predetermined set of personalized avatars 802 being displayed by a client device in accordance with one embodiment. As shown beneath the media content item 706, the personalized avatar interface 802 displays the selectable predetermined set of personalized avatars 812 that match the profile information indicated in a user profile 702 of the client device while viewing the content collection.

In one example, if the user chooses, he can select from one of the predetermined set of avatars 812 from the personalized avatar interface 802 that match the profile information of the user in order to permit the user to reply to a second computing device with the selected personalized avatar while viewing the content collection. A camera icon 804 allows the user to access an integrated camera in the client device 102, the personalized avatar extension button 806 which in one example, generates an extended personalized avatar interface containing additional personalized avatars associated with a predetermined set of avatars mapped to the user profile or containing additional personalized avatars associated with text information input into the text interface 504. A previous content collection button 808 permits the users to retrieve previously stored or view content collections. Upon detecting a user gesture, the client device can activate or deactivate the keyboard interface 810.

Figure 9:
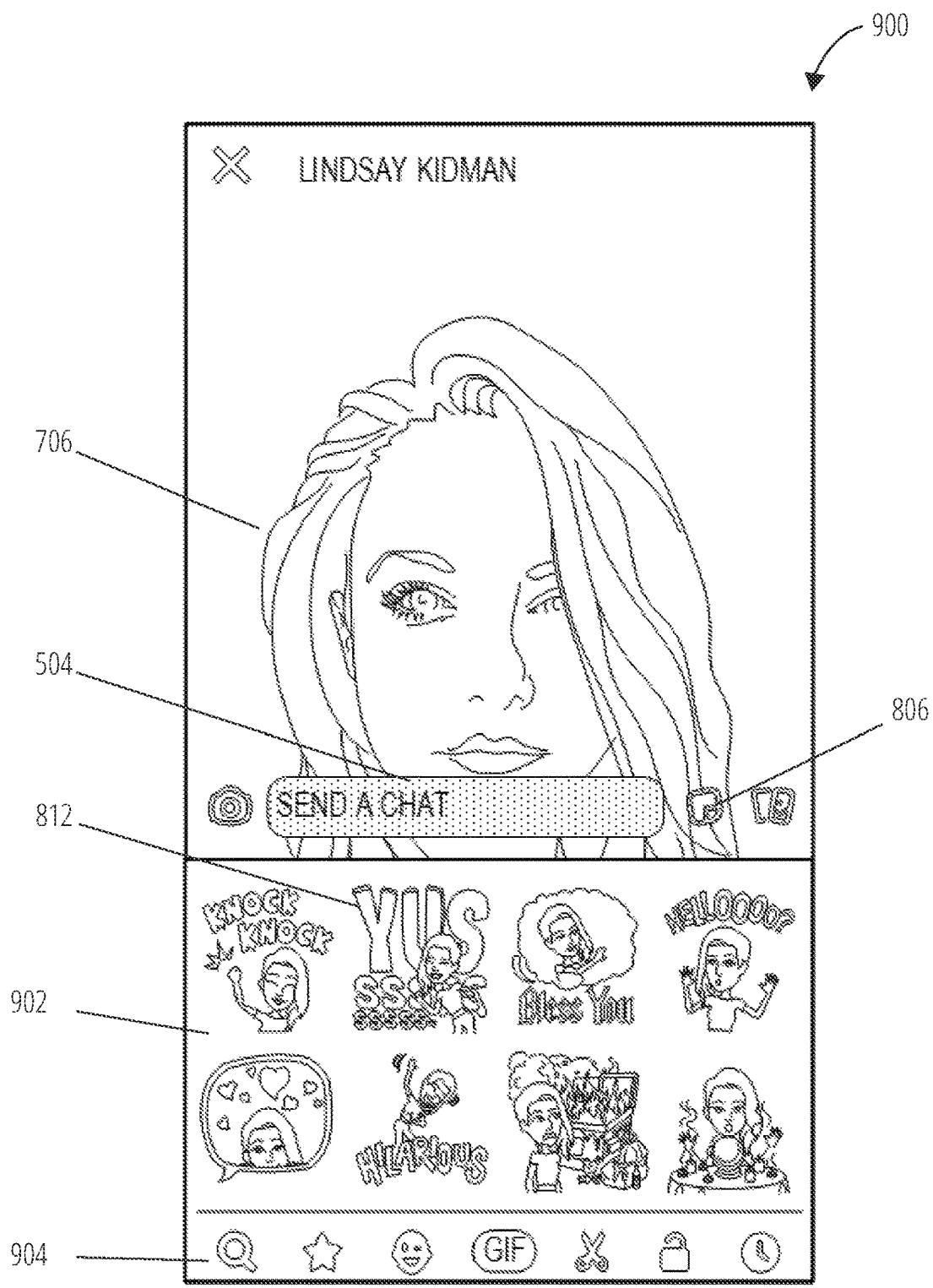
FIG. 9 illustrates an example of a user interface depicting at least a text interface and an extendable personalized avatar interface being displayed by a client device, in accordance with one embodiment.

FIG. 9 illustrates an example of a user interface depicting at least a text interface 504 and extendable personalized avatar interface 902 being displayed by a client device, in accordance with one embodiment. As shown in FIG. 9, the media content item 706 depicts the image as shown in FIGS. 7 and 8, as well as the text interface 504 not including any text information. An extendable personalized avatar interface 902 is generated based on a user gesture or by activating the extendable extension button 806. The extendable personalized avatar interface 902 displays the selectable predetermined set of personalized avatars 812 that match the profile information indicated in a user profile 702 of the client device while viewing the content collection.

In one example, each of the selectable personalized avatars 812 from the extendable personalized avatar interface 902 match (in whole or in part) avatar characteristics associated with a user's affinity stored in a user's profile of the client device 102 or a second user's affinity stored at a second user profile of a second client device. For instance, a user affinity can include sentiment categories that reflect a user's personality, likeness, attributes, moods, or state of minds as depicted in the user profile 702. The sentiment categories can contain characteristics that are mapped a predetermined set of avatars stored at the avatar table 320. The predetermined set of avatars stored at the avatar table 320 that are mapped to sentiment avatar category digitally depict the associated user affinity. The second client device can be any client device that is connected via the social network system 122 with the client device 102. A content collection tool bar 904 is shown in FIG. 9 which contains various design tools that when activated, allow the user to manage an ephemeral message time period, digital expression objects, media overlay icons, or edit media content items during content collection generation.

Figure 10:
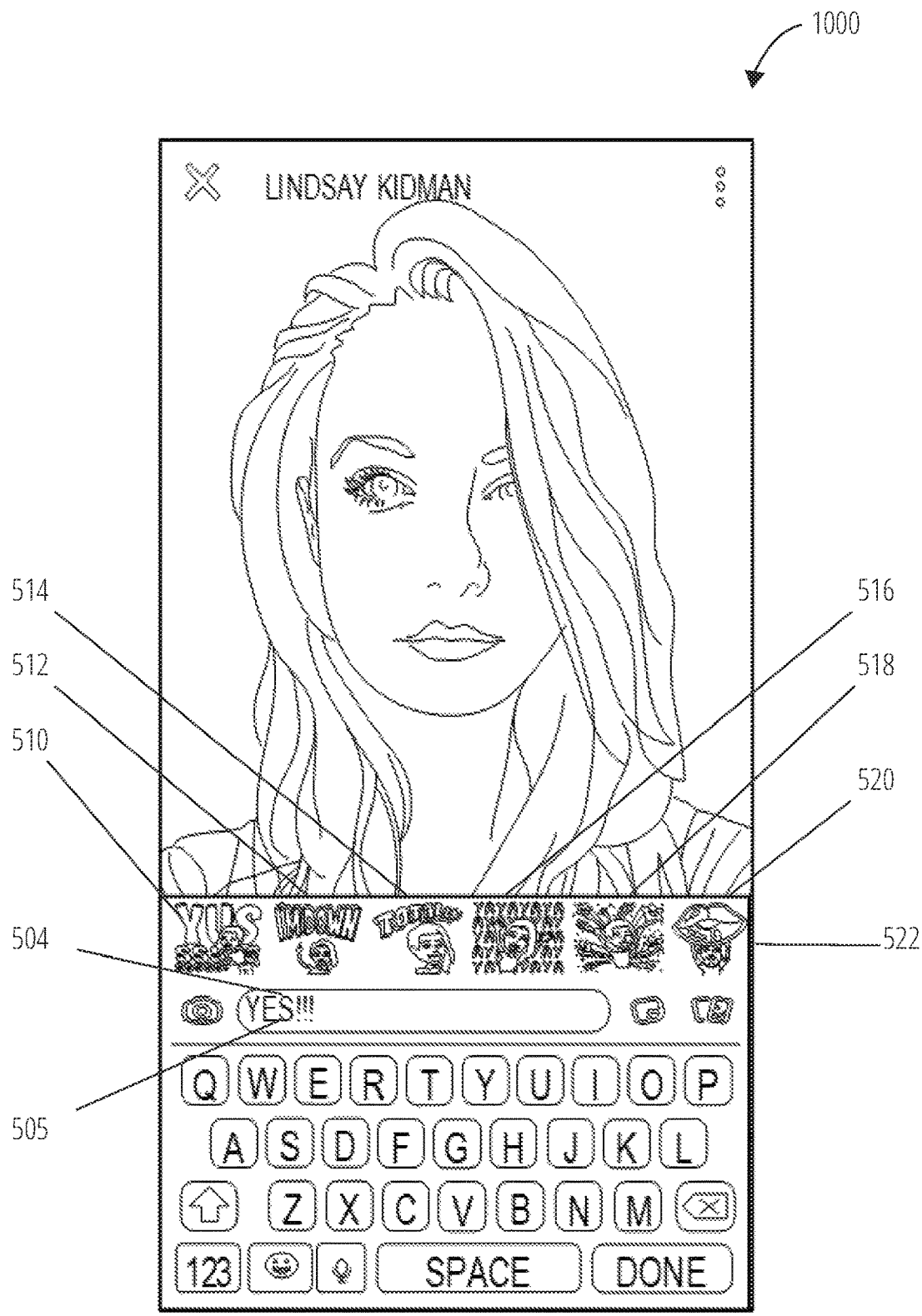
FIG. 10 illustrates an example of a user interface depicting at least a personalized avatar interface overlaid on top of the media content item being displayed by a client device based on text shown in the text interface in accordance with one embodiment.

FIG. 10 illustrates an example of a user interface 1000 depicting at least a personalized avatar interface 522 displaying selectable personalized avatars associated with the text information 505 input into the text interface 504. The user interface 1000 depicts the display after execution of the operations of the retrieval system 506 of the avatar recommendation system 124. In one example, the text interface 504 includes text information 505 as "Yes!!!" The avatar recommendation system 124 identifies each phrase and special character within the string as "yes" and "!!!" which may be referred to as a first characteristic that corresponds to metadata stored in the metadata table 316.

The avatar recommendation system 124 determines that "Yes" and "! !!" are associated with avatar characteristics in the segment table 318 that are associated with personalized avatars stored in the avatar table 320 and illustrated in the personalized avatar interface 522 as the selectable personalized avatars 510 containing avatar characteristics "YUS;" avatar 512 containing "I'm down;" avatar 514 containing "totally;" avatar 516 containing "Yay;" avatar 518 containing an exclamation denoting excitement and enthusiasm; and avatar 520 containing exclamation denoting excitement and enthusiasm, e.g. Kiss or love it. The order in which the personalized avatars 510-520 are arranged in the personalized avatar interface 522 correspond to the retrieval system 506 ranking function in which each avatar in the avatar interface 522 are displayed according to a number or frequency of confirmed matches between the text information and associated avatar characteristics.

In one example, the user of the client device 102 is viewing a content collection and inputs "Yes!!!" into the text interface 504. The client device 102 generates the personalized avatar interface 522 containing selectable personalized avatars 510-520 that are selected and communicated to a second computing device while the user of the client device 102 is actively viewing the content collection.

Figure 11:
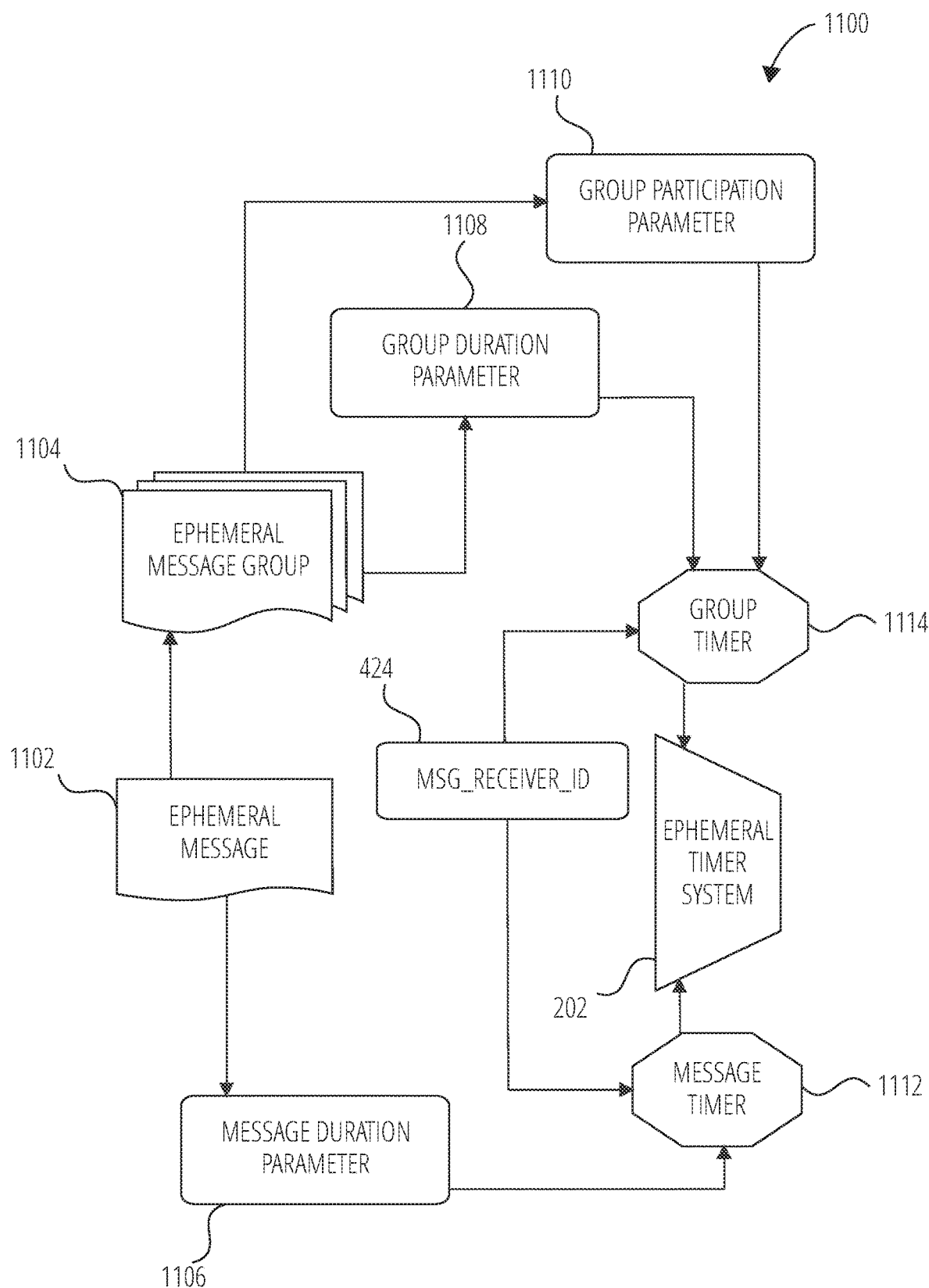
FIG. 11 is a schematic block diagram illustrating an example access-limiting process, in terms of which access to content (e.g., an ephemeral message, and associated multimedia and media content payload of data) or a content collection (e.g., an ephemeral message content collection) may be time-limited (e.g., made ephemeral) in accordance with some embodiments of the present disclosure.

FIG. 11 is a schematic diagram illustrating an access-limiting process 1100, in terms of which access to content (e.g., an ephemeral message 1102, and associated multimedia payload of data) or a content collection (e.g., an ephemeral message group 1104) may be time-limited (e.g., made ephemeral).

An ephemeral message 1102 is shown to be associated with a message duration parameter 1106, the value of which determines an amount of time that the ephemeral message 1102 will be displayed to a receiving user of the ephemeral message 1102 by the messaging client application 104. In one embodiment, an ephemeral message 1102 is viewable by a receiving user for up to a maximum of 10 seconds, depending on the amount of time that the sending user specifies using the message duration parameter 1106.

The message duration parameter 1106 and the message receiver identifier 424 are shown to be inputs to a message timer 1112, which is responsible for determining the amount of time that the Ephemeral message 1102 is shown to a particular receiving user identified by the message receiver identifier 424. In particular, the ephemeral message 1102 will only be shown to the relevant receiving user for a time period determined by the value of the message duration parameter 1106. The message timer 1112 is shown to provide output to a more generalized ephemeral timer system 202, which is responsible for the overall timing of display of content (e.g., an ephemeral message 1102) to a receiving user.

The ephemeral message 11022 is shown in FIG. 11 to be included within an ephemeral message group 1104 (e.g., a collection of messages in a personal content collection, or an event content collection). The ephemeral message group 1104 has an associated group duration parameter 1108, a value of which determines a time-duration for which the ephemeral message group 1104 is presented and accessible to users of the messaging system 100. The group duration parameter 1108, for example, may be the duration of a music concert, where the ephemeral message group 1104 is a collection of content pertaining to that concert. Alternatively, a user (either the owning user or a curator user) may specify the value for the group duration parameter 1108 when performing the setup and creation of the ephemeral message group 1104.

Additionally, each ephemeral message 1102 within the ephemeral message group 1104 has an associated group participation parameter 1110, a value of which determines the duration of time for which the ephemeral message 1102 will be accessible within the context of the ephemeral message group 1104. Accordingly, a particular ephemeral message group 1104 may "expire" and become inaccessible within the context of the ephemeral message group 1104, prior to the ephemeral message group 1104 itself expiring in terms of the group duration parameter 1108. The group duration parameter 1108, group participation parameter 1110, and message receiver identifier 424 each provide input to a group timer 1114, which operationally determines, firstly, whether a particular ephemeral message 1102 of the ephemeral message group 1104 will be displayed to a particular receiving user and, if so, for how long. Note that the ephemeral message group 1104 is also aware of the identity of the particular receiving user as a result of the message receiver identifier 424.

Accordingly, the group timer 1114 operationally controls the overall lifespan of an associated ephemeral message group 1104, as well as an individual ephemeral message 1102 included in the ephemeral message group 1104. In one embodiment, each and every ephemeral message 1102 within the ephemeral message group 1104 remains viewable and accessible for a time-period specified by the group duration parameter 1108. In a further embodiment, a certain ephemeral message 1102 may expire, within the context of ephemeral message group 1104, based on a group participation parameter 1110. Note that a message duration parameter 1106 may still determine the duration of time for which a particular ephemeral message 1102 is displayed to a receiving user, even within the context of the ephemeral message group 1104. Accordingly, the message duration parameter 1106 determines the duration of time that a particular ephemeral message 1102 is displayed to a receiving user, regardless of whether the receiving user is viewing that ephemeral message 1102 inside or outside the context of an ephemeral message group 1104.

The ephemeral timer system 202 may furthermore operationally remove a particular ephemeral message 1102 from the ephemeral message group 1104 based on a determination that it has exceeded an associated group participation parameter 1110. For example, when a sending user has established a group participation parameter 1110 of 24 hours from posting, the ephemeral timer system 202 will remove the relevant ephemeral message 1102 from the ephemeral message group 1104 after the specified 24 hours. The ephemeral timer system 202 also operates to remove an ephemeral message group 1104 either when the group participation parameter 1110 for each and every ephemeral message 1102 within the ephemeral message group 1104 has expired, or when the ephemeral message group 1104 itself has expired in terms of the group duration parameter 1108.

In certain use cases, a creator of a particular ephemeral message group 1104 may specify an indefinite group duration parameter 1108. In this case, the expiration of the group participation parameter 1110 for the last remaining ephemeral message 1102 within the ephemeral message group 1104 will determine when the ephemeral message group 1104 itself expires. In this case, a new ephemeral message 1102, added to the ephemeral message group 1104, with a new group participation parameter 1110, effectively extends the life of an ephemeral message group 1104 to equal the value of the group participation parameter 1110.

Responsive to the ephemeral timer system 202 determining that an ephemeral message group 1104 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 1104 to no longer be displayed within a user interface of the messaging client application 104. Similarly, when the ephemeral timer system 202 determines that the message duration parameter 1106 for a particular ephemeral message 1102 has expired, the ephemeral timer system 202 causes the messaging client application 104 to no longer display an indicium (e.g., an icon or textual identification) associated with the ephemeral message 1102.

Figure 12:
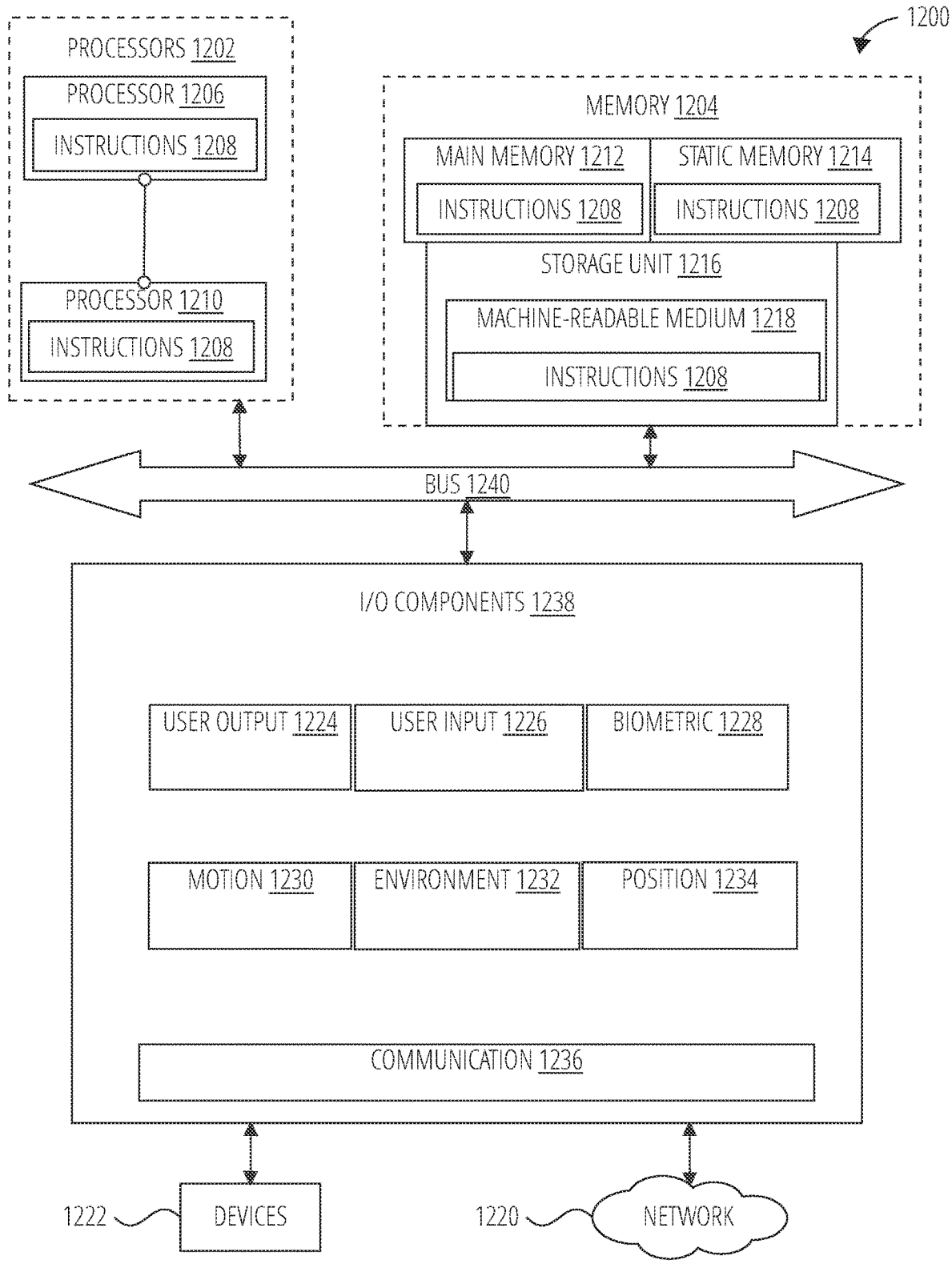
FIG. 12 is a diagrammatic representation of a machine in the form of a computer system within which a set of instructions may be executed for causing the machine to perform any one or more of the methodologies discussed herein, in accordance with some example embodiments.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1238, which may be configured to communicate with each other via a bus 1240. In an example embodiment, the processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1206 and a Processor 1210 that execute the instructions 1208. The term "Processor" is intended to include multi-core processors that may comprise two or more independent processors (sometimes referred to as "cores") that may execute instructions contemporaneously. Although FIG. 12 shows multiple processors 1202, the machine 1200 may include a single Processor with a single core, a single Processor with multiple cores (e.g., a multi-core Processor), multiple processors with a single core, multiple processors with multiples cores, or any combination thereof.

The memory 1204 includes a main memory 1212, a static memory 1214, and a storage unit 1216, both accessible to the processors 1202 via the bus 1240. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the Processor's cache memory), or any suitable combination thereof, during execution thereof by the machine 1200.

The I/O components 1238 may include a wide variety of components to receive input, provide output, produce output, transmit information, exchange information, capture measurements, and so on. The specific I/O components 1238 that are included in a particular machine will depend on the type of machine. For example, portable machines such as mobile phones may include a touch input device or other such input mechanisms, while a headless server machine will likely not include such a touch input device. It will be appreciated that the I/O components 1238 may include many other components that are not shown in FIG. 12. In various example embodiments, the I/O components 1238 may include user output components 1224 and user input components 1226. The user output components 1224 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location or force of touches or touch gestures, or other tactile input components), audio input components (e.g., a microphone), and the like.

In further example embodiments, the I/O components 1238 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 include acceleration sensor components (e.g., accelerometer), gravitation sensor components, rotation sensor components (e.g., gyroscope). The environmental components 1232 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1234 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 1238 further include communication components 1236 operable to couple the machine 1200 to a network 1220 or devices 1222 via respective coupling or connections. For example, the communication components 1236 may include a network interface Component or another suitable device to interface with the network 1220. In further examples, the communication components 1236 may include wired communication components, wireless communication components, cellular communication components, Near Field Communication (NFC) components, Bluetooth components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1212, static memory 1214, or memory of the processors 1202) or storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed embodiments.

The instructions 1208 may be transmitted or received over the network 1220, using a transmission medium, via a network interface device (e.g., a network interface Component included in the communication components 1236) and using any one of several well-known transfer protocols (e.g., hypertext transfer protocol (HTTP)). Similarly, the instructions 1208 may be transmitted or received using a transmission medium via a coupling (e.g., a peer-to-peer coupling) to the devices 1222.

Figure 13:
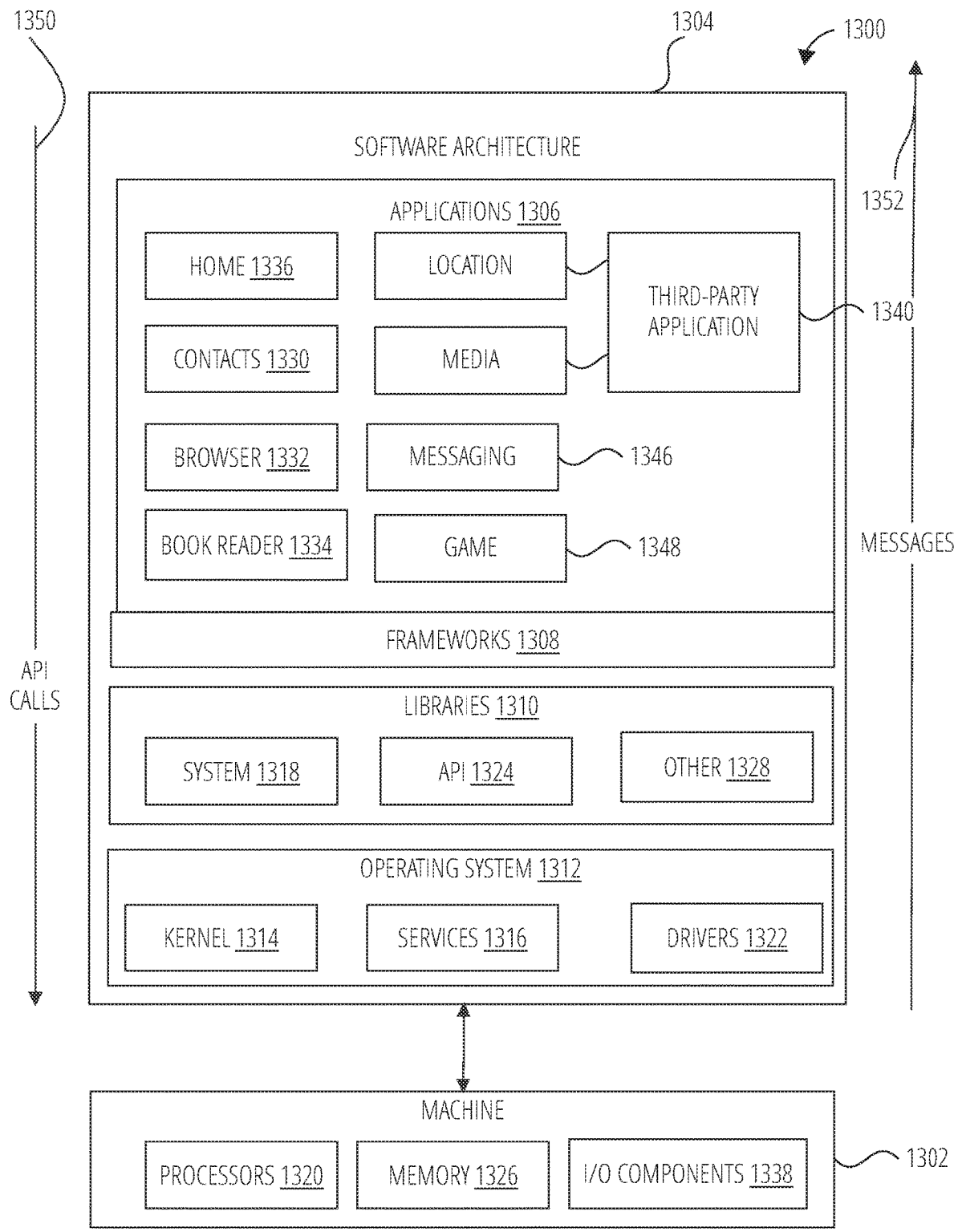
FIG. 13 is block diagram showing a software architecture within which the present disclosure may be implemented, according to an example embodiment.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, Processor management (e.g., scheduling), Component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1310 provide a low-level common infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a high-level common infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example embodiment, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The e applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving, by a first computing device, a content collection from a second computing device, wherein the content collection includes a media content item captured by an integrated camera of the second computing device;

causing a first user interface to be displayed that includes the media content item and a text interface overlaid on the media content item;

retrieving a first plurality of personalized avatars that corresponds to one or more characteristics of a profile of a user of the first computing device;

causing a second interface to be displayed that includes the text interface and the first plurality of personalized avatars;

analyzing text data to identify a first characteristic based on the text data, the text data being input in the text interface and the first characteristic comprising a phrase representing the input of the text data;

retrieving a second plurality of personalized avatars different from the first plurality of personalized avatars, the second plurality of personalized avatars are individually associated with a plurality of avatar characteristics;

determining a selection of personalized avatars from the second plurality of personalized avatars, the selection of personalized avatars comprises personalized avatars that integrate the first characteristic and are associated with avatar characteristics that match the first characteristic;

determining an individual ranking for individual personalized avatars included in the selection of personalized avatars, the individual rankings being based on at least one of a number or frequency of confirmed matches between the text data and one or more characteristics associated with the individual personalized avatars;

generating a third user interface that includes a personalized avatar interface comprising the selection of personalized avatars; and causing the third user interface to be displayed such that the personalized avatar interface comprising the selection of personalized avatars is overlaid on the media content item, the selection of personalized avatars being displayed in the personalized avatar interface based on the individual rankings of the individual personalized avatars.

2. The method of claim 1, wherein the method further comprises:

transmitting, to the second computing device, a selected personalized avatar from the personalized avatar interface during access to the content collection.

3. The method of claim 1, wherein the personalized avatar interface is displayed in the third user interface in conjunction with the media content item and the text interface responsive to the text data being entered in the text interface.

4. The method of claim 1, wherein the text data comprises an alpha-numeric string of characters.

5. The method of claim 1, wherein the first characteristic comprises a sub-combination of letters, words, numbers, or special characters within the text data.

6. The method of claim 1, wherein the avatar characteristics comprises letters, words, numbers, or special characters, or any combination thereof.

7. The method of claim 1, further comprising:
prior to receiving the text data,
causing the first computing device to display the content collection;
detecting a user gesture on a display device that displays the content collection;
generating an additional personalized avatar interface, in response to detecting the user gesture;
causing the additional personalized avatar interface to be overlaid on top of the content collection;
transmitting, to the second computing device, a selected personalized avatar from the additional personalized avatar interface during access to the content collection;
detecting a second user gesture; and
causing the additional personalized avatar interface to be removed from the display device in response to the second user gesture.

8. The method of claim 7, wherein the additional personalized avatar interface comprises a second selection of personalized avatars associated with a sentiment avatar category.

9. The method of claim 7, further comprising, associating a first user affinity in the profile of the user at the first computing device.

10. The method of claim 7, further comprising associating a second user affinity stored in an additional profile of an additional user of the second computing device.

11. A system comprising:
a processor; and
a memory storing instructions that, when executed by the processor, configure the system to perform operations comprising:

receiving a content collection, wherein the content collection includes a media content item captured by an integrated camera of a client device;

causing a first user interface to be displayed that includes the media content item and a text interface overlaid on the media content item;

retrieving a first plurality of personalized avatars that corresponds to one or more characteristics of a profile of a user of a first computing device;

causing a second interface to be displayed that includes the text interface and the first plurality of personalized avatars;

analyzing text data to identify a first characteristic based on the text data, the text data being input in the text interface and the first characteristic comprising a phrase representing the input of the text data;

retrieving a second plurality of personalized avatars different from the first plurality of personalized avatars, the second plurality of personalized avatars are individually associated with a plurality of avatar characteristics;

determining a selection of personalized avatars from the second plurality of personalized avatars, the selection of personalized avatars comprise personalized avatars that integrate the first characteristic and are associated with avatar characteristics that match the first characteristic;

determining an individual ranking for individual personalized avatars included in the selection of personalized avatars, the individual ranking being based on at least one of a number or frequency of confirmed matches between the text data and one or more characteristics associated with the individual personalized avatars;

generating a third user interface that includes a personalized avatar interface comprising the selection of personalized avatars; and causing the third user interface to be displayed such that a personalized avatar interface comprising the selection of personalized avatars is overlaid on the media item, the selection of personalized avatars being displayed in the personalized avatar interface based on the individual rankings of the individual personalized avatars.

12. The system of claim 11, wherein the system is configured to perform operations further comprising:
transmitting, to the client device, a selected personalized avatar from the personalized avatar interface during access to the content collection.

13. The system of claim 11, wherein the content collection comprises an ephemeral message or ephemeral content collection.

14. The system of claim 11, wherein the text data comprises an alpha-numeric string of characters.

15. The system of claim 11, wherein the system is configured to perform operations further comprising:
prior to receiving the text data,
causing an additional client device to display of the content collection;
detecting a user gesture on a display device that displays the content collection;
generating an additional personalized avatar interface, in response to detecting the user gesture;
causing the additional personalized avatar interface to be overlaid on top of the content collection;
transmitting, to the client device, a selected personalized avatar from the additional personalized avatar interface during access to the content collection;
detecting a second user gesture; and
causing the additional personalized avatar interface to be removed from the display device in response to the second user gesture.

16. The system of claim 15, wherein the additional personalized avatar interface comprises a second selection of personalized avatars associated with a sentiment avatar category.

17. The system of claim 16, wherein the sentiment avatar category is associated with a first user affinity stored in a first user profile at a first computing device.

18. The system of claim 16, wherein the sentiment avatar category is associated with a second user affinity stored in a second user profile at a second computing device.

19. One or more non-transitory computer-readable storage media, the one or more non-transitory computer-readable storage media including instructions that when executed by a computer, cause the computer to execute operations comprising:
receiving, by a first computing device, a content collection from a second computing device, wherein the content collection includes a media content item captured by an integrated camera of the first computing device;
causing a first user interface to be displayed that includes the media content item and a text interface overlaid on the media content item;
retrieving a first plurality of personalized avatars that corresponds to one or more characteristics of a profile of a user of the first computing device;
causing a second interface to be displayed that includes the text interface and the first plurality of personalized avatars;
analyzing text data to identify a first characteristic based on the text data, the text data being input in the text interface and the first characteristic comprising a phrase representing the input of the text data;
retrieving a second plurality of personalized avatars different from the first plurality of personalized avatars, the second plurality of personalized avatars are individually associated with a plurality of avatar characteristics;
determining a selection of personalized avatars from the second plurality of personalized avatars, the selection of personalized avatars comprise personalized avatars that integrate the first characteristic and are associated with avatar characteristics that match the first characteristic;
determining an individual ranking for individual personalized avatars included in the selection of personalized avatars, the individual ranking being based on at least one of a number or frequency of confirmed matches between the text data and one or more characteristics associated with the individual personalized avatars;
generating a third user interface that includes a personalized avatar interface comprising the selection of personalized avatars; and
causing the third user interface to be displayed such that the personalized avatar interface comprising the selection of personalized avatars to be overlaid on the media content item, the selection of personalized avatars being displayed in the personalized avatar interface based on the individual rankings of the individual personalized avatars.

20. The one or more non-transitory computer-readable storage media of claim 19, wherein the instructions cause the computer to execute the operations comprising:
transmitting, to the second computing device, a selected personalized avatar from the personalized avatar interface during access to the content collection;
detecting a user gesture on a display device that displays the content collection;
generating a second personalized avatar interface, in response to detecting the user gesture;
causing the second personalize avatar interface to be overlaid on top of the content collection;
transmitting, to the second computing device, a selected personalized avatar from the second personalized avatar interface during access to the content collection;
detecting a second user gesture; and
removing the second personalized avatar interface from the display device in response to the second user gesture, wherein the second personalized avatar interface comprises a second selection of personalized avatars associated with a sentiment avatar category stored in a first user profile at the first computing device and a second user profile at the second computing device.

* * * * *